(12) United States Patent
Ayzenberg

(10) Patent No.: US 10,075,737 B2
(45) Date of Patent: Sep. 11, 2018

(54) METHOD AND APPARATUS FOR SHIFT DCT-BASED SHARPENING OF A VIDEO IMAGE

(75) Inventor: Oscar Ayzenberg, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 585 days.

(21) Appl. No.: 13/315,251

(22) Filed: Dec. 8, 2011

(65) Prior Publication Data

US 2013/0051694 A1 Feb. 28, 2013

Related U.S. Application Data

(60) Provisional application No. 61/527,774, filed on Aug. 26, 2011.

(51) Int. Cl.
*G06K 9/40* (2006.01)
*H04N 19/86* (2014.01)
*H04N 19/117* (2014.01)
*H04N 19/18* (2014.01)
*H04N 19/48* (2014.01)

(52) U.S. Cl.
CPC ........... *H04N 19/86* (2014.11); *H04N 19/117* (2014.11); *H04N 19/18* (2014.11); *H04N 19/48* (2014.11)

(58) Field of Classification Search
CPC ......... G06T 9/007; G06T 5/001; G06T 7/403; H04N 1/2112; H04N 1/46; H04N 19/00278; H04N 19/00; H04N 19/00157; H04N 19/00296; H04N 21/23418
See application file for complete search history.

(56) References Cited

U.S. PATENT DOCUMENTS

2007/0025447 A1* 2/2007 Kojokaro et al. ....... 375/240.24
2010/0066912 A1* 3/2010 Kumwilaisak et al. ...... 348/607

OTHER PUBLICATIONS

Nosratinia, A., "Enhancement of JPEG-Compressed Images by Re-application of JPEG", Kluwer Academic Publishers, Netherlands, Oct. 21, 2002.

* cited by examiner

*Primary Examiner* — Eueng-Nan Yeh
(74) *Attorney, Agent, or Firm* — The Marbury Law Group

(57) ABSTRACT

A method of processing a digital image includes applying a discrete cosine transform (DCT) to a plurality of shifted digital images to produce a plurality of DCT coefficients, amplifying at least some of the DCT coefficients by a variable gain, applying an inverse DCT to the amplified DCT coefficients, and averaging the results to produce a visually sharper image. The variable gain may be a function of the amplitude of the DCT coefficients.

19 Claims, 7 Drawing Sheets

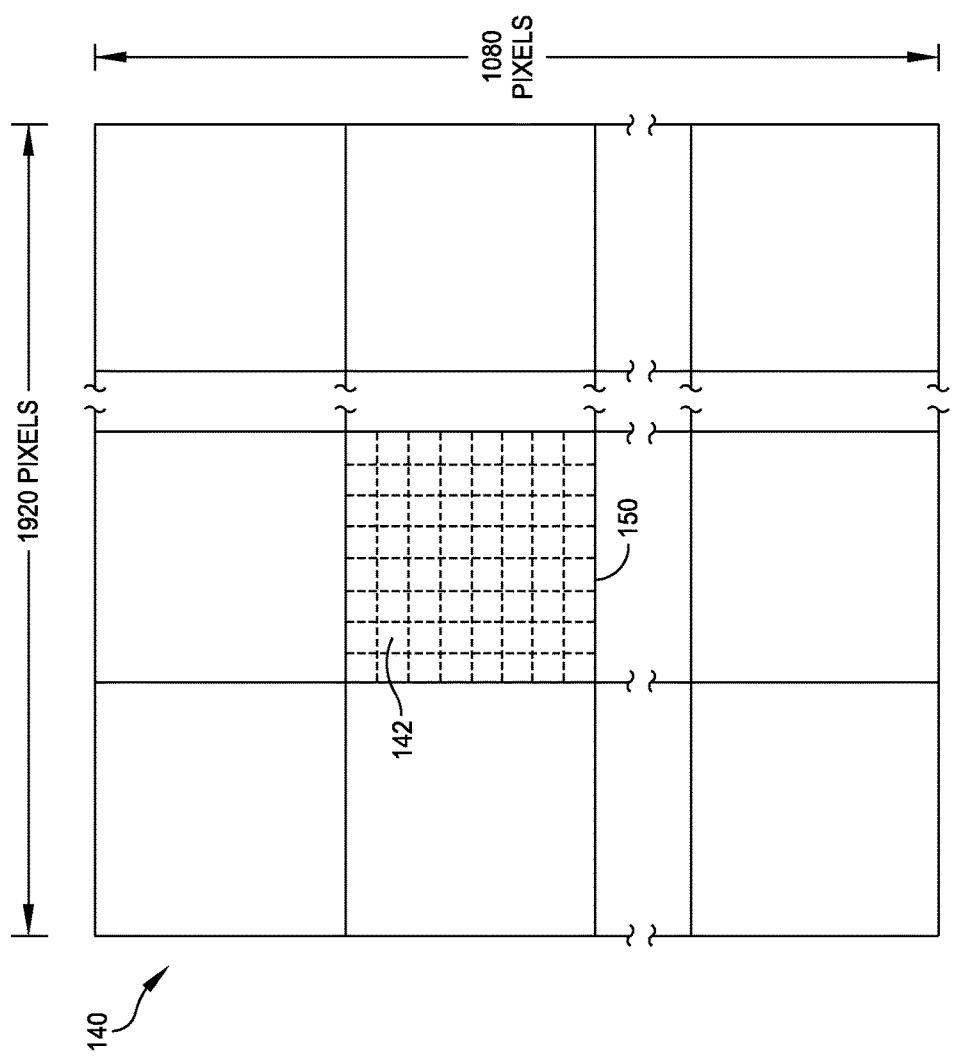

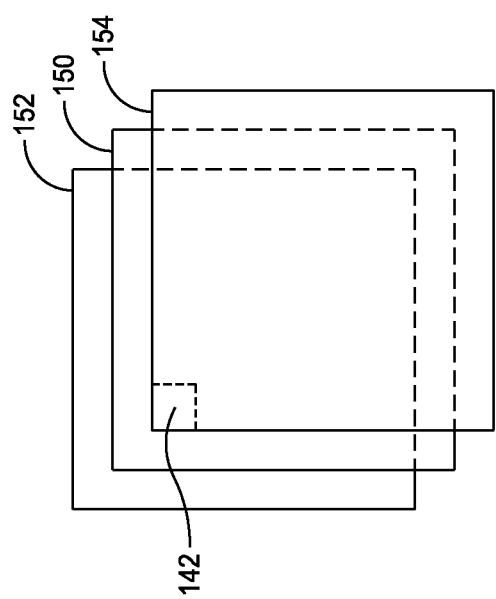

METHOD AND APPARATUS FOR SHIFT DCT-BASED SHARPENING OF A VIDEO IMAGE

RELATED APPLICATIONS

This application claims priority under 35 U.S.C. § 119(e) to U.S. Provisional Application Ser. No. 61/527,774, entitled "SHIFT DCD BASED SHARPENING," filed on Aug. 26, 2011, which is herein incorporated by reference in its entirety.

BACKGROUND

Embodiments of the present invention relate generally to video signal processing, and more particularly, to methods and apparatus for enhancing the visual quality of video images, such as those used in television broadcasts.

SUMMARY

Aspects and embodiments are directed to methods and apparatus for enhancing the quality of an image or video using averaging of multiple, shifted image blocks via the Discrete Cosine Transform (DCT). In one embodiment, the DCT coefficients are shaped using a variable gain, which can increase the sharpness of the image or video without introducing artifacts associated with blockiness.

According to one embodiment, a method of processing a digital image includes shifting the digital image by x vertical pixels and y horizontal pixels to produce a shifted digital image and applying a discrete cosine transform (DCT) to the shifted digital image to produce a plurality of DCT coefficients including a plurality of non-DC DCT coefficients. The method further includes applying a non-linear transform to the DCT coefficients to produce a plurality of modified DCT coefficients. The non-linear transform is configured to amplify the non-DC DCT coefficients by a variable gain. The method further includes applying an inverse DCT to the modified DCT coefficients to produce a modified digital image, shifting the modified digital image by −x vertical pixels and −y horizontal pixels to produce a first one of a plurality of realigned digital images, and repeating the acts of shifting by x and y pixels, applying the DCT, applying the non-linear transform, applying the inverse DCT, and shifting by −x and −y pixels for a plurality of different values of x and y to produce remaining ones of the realigned digital images. The method further includes combining the realigned digital images to produce a processed digital image.

In another embodiment, the variable gain may be a function of each of the plurality of non-DC DCT coefficients. In yet another embodiment, each of the non-DC DCT coefficients represents an amplitude. The function may be configured to produce approximately a unity gain for each of the non-DC DCT coefficients having frequencies near a low end and near a high end of a range of frequencies and a non-unity gain for each of the non-DC DCT coefficients therebetween. In yet another embodiment, the method may include storing pre-determined gain values for the function in a lookup table (LUT). In yet another embodiment, applying the non-linear transform may include multiplying each of the plurality of non-DC DCT coefficients by a gain selected from the LUT based on a respective one of the non-DC DCT coefficients.

In another embodiment, the function may be configured to produce approximately a unity gain for each of the non-DC DCT coefficients corresponding to a noise signal in the shifted digital image and/or an overshoot signal in the shifted digital image. In yet another embodiment, each of the non-DC DCT coefficients may represent an amplitude. The function may be further configured to produce an increasing gain as the amplitude increases below a predetermined value, and to produce a decreasing gain as the amplitude increases above the predetermined value.

In another embodiment, the DCT coefficients may include a DC DCT coefficient. The method may further include applying a unity gain to the DC DCT coefficient.

In another embodiment, the method may further include performing the acts of shifting by x and y pixels, applying the DCT, applying the non-linear transform, applying the inverse DCT, and shifting by −x and −y pixels for the different values of x and y substantially simultaneously.

In another embodiment, the method may include averaging the realigned digital images.

According to one embodiment, a computer readable medium includes computer-executable instructions that when executed on at least one processor perform a method of processing a digital image includes shifting the digital image by x vertical pixels and y horizontal pixels to produce a shifted digital image and applying a discrete cosine transform (DCT) to the shifted digital image to produce a plurality of DCT coefficients including a plurality of non-DC DCT coefficients. The method further includes applying a non-linear transform to the DCT coefficients to produce a plurality of modified DCT coefficients. The non-linear transform is configured to amplify the non-DC DCT coefficients by a variable gain. The method further includes applying an inverse DCT to the modified DCT coefficients to produce a modified digital image, shifting the modified digital image by −x vertical pixels and −y horizontal pixels to produce a first one of a plurality of realigned digital images, and repeating the acts of shifting by x and y pixels, applying the DCT, applying the non-linear transform, applying the inverse DCT, and shifting by −x and −y pixels for a plurality of different values of x and y to produce remaining ones of the realigned digital images. The method further includes combining the realigned digital images to produce a processed digital image.

According to one embodiment, an image processing device includes an input to receive a digital image, an output to provide a processed digital image, and a processor coupled to the input and the output. The processor is configured to shift the digital image by x vertical pixels and y horizontal pixels to produce a shifted digital image and apply a discrete cosine transform (DCT) to the shifted digital image to produce a plurality of DCT coefficients including a plurality of non-DC DCT coefficients. The processor is further configured to apply a non-linear transform to the DCT coefficients to produce a plurality of modified DCT coefficients. The non-linear transform is configured to amplify the non-DC DCT coefficients by a variable gain. The processor is further configured to apply an inverse DCT to the modified DCT coefficients to produce a modified digital image, shift the modified digital image by −x vertical pixels and −y horizontal pixels to produce one of a plurality of realigned digital images, and repeat the acts of shifting by x and y pixels, applying the DCT, applying the non-linear transform, applying the inverse DCT, and shifting by −x and −y pixels for a plurality of different values of x and y to produce remaining ones of the realigned digital images. The processor is further configured to combine the plurality of realigned digital images to produce the processed digital image.

In another embodiment, the variable gain may be a function of each of the plurality of non-DC DCT coefficients. In yet another embodiment, each of the non-DC coefficients may represent an amplitude. The function may be configured to produce approximately a unity gain for each of the non-DC DCT coefficients having frequencies near a low end and near a high end of a range of frequencies and a non-unity gain for each of the non-DC DCT coefficients therebetween. In yet another embodiment, the processor may be further configured to store pre-determined gain values for the function in a lookup table (LUT). In yet another embodiment, the processor may be configured to multiply each of the non-DC DCT coefficients by a gain selected from the LUT based on a respective one of the non-DC DCT coefficients.

In another embodiment, the processor may be configured to produce approximately a unity gain for each of the non-DC DCT coefficients corresponding to a noise signal in the shifted digital image and/or an overshoot signal in the shifted digital image. In yet another embodiment, each of the non-DC DCT coefficients may represent an amplitude. The processor may be configured to produce an increasing gain as the amplitude increases below a predetermined value, and to produce a decreasing gain as the amplitude increases above the predetermined value.

In another embodiment, the DCT coefficients may include a DC DCT coefficient. The processor may be configured to apply a unity gain to the DC DCT coefficient.

In another embodiment, the processor may be configured to perform the acts of shifting by x and y pixels, applying the DCT, applying the non-linear transform, applying the inverse DCT, and shifting by −x and −y pixels for the plurality of different values of x and y substantially simultaneously.

In another embodiment, the processor may be configured to average the plurality of realigned digital images.

In another embodiment, the image processing device may be configured to be integrated into a digital television, a mobile telephone, a set top box and/or an integrated circuit.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 2A and 2B illustrate one example of a video signal shifting technique in accordance with an embodiment;

DETAILED DESCRIPTION

Figure 1:
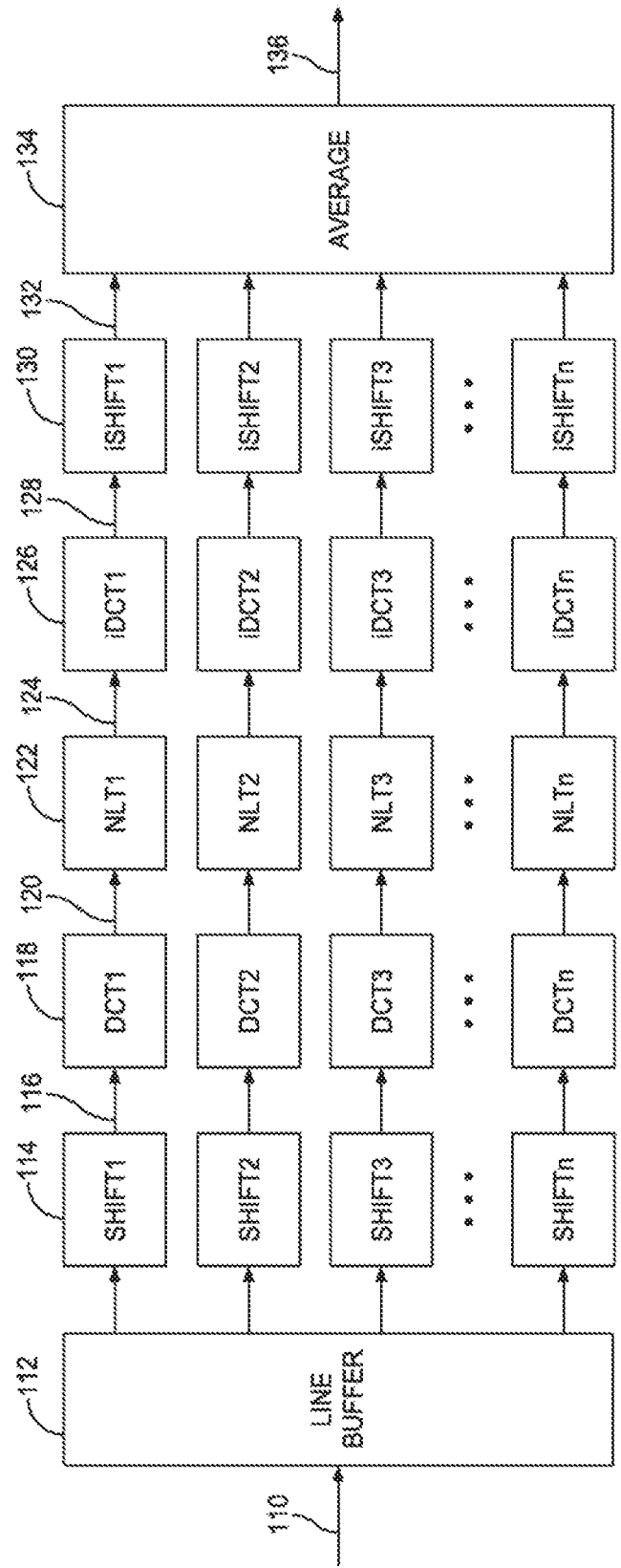
FIG. 1 is a functional block diagram of a conventional video signal processing method.

Embodiments of the present invention are not limited in their application to the details of construction and the arrangement of components set forth in the following description or illustrated in the drawings. Embodiments of the present invention are capable of other embodiments and of being practiced or carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

The perceived sharpness of a television (TV) image is an important parameter that determines picture quality. High-definition television (HDTV), in particular, has a high native panel resolution (e.g., 1920×1080 pixels) that enables a viewer to perceive fine details in the picture. However, because many video sources have resolutions lower than the native resolution of HDTV (e.g., 720×480 pixels, as in standard definition television), those sources contain fewer details than the TV is capable of displaying. Lower resolution sources may be up-scaled to the higher resolution of the display, but up-scaling alone cannot add detail to the picture. Furthermore, conventional up-scaling techniques produce artifacts that degrade the picture quality, and therefore produce undesirable results. Even if the video source is not originally at a lower resolution than the TV, compressing the video signal can also cause losses in detail, and artifacts related to quantization of the compressed signal may be apparent.

One conventional technique for enhancing picture quality includes detecting certain characteristics of the video signal, such as edge amplitude, edge slope, and the presence of multiple edges, textures and noise. Based on these characteristics, a mix of linear and non-linear image processing can be used to produce a result that, while visually satisfactory, still includes observable and undesirable artifacts, particularly on high resolution displays. For example, using one conventional technique, the sharpness of video images can be enhanced using block transform coding via the Discrete Cosine Transform (DCT). The DCT is a simple and effective method commonly used for image (e.g., JPEG) and video compression (e.g., MPEG). Although this known technique may provide a noticeably sharper image, it also produces undesirable artifacts caused by noise amplification due to amplification of high frequencies, overshoot, and blockiness (discontinuities at the block boundaries).

One known technique for reducing blockiness in source images encoded using conventional compression methods (e.g., JPEG) is described by Nosratinia in "Enhancement of JPEG-Compressed Images by Re-application of JPEG" (University of Texas at Dallas, 2002), which is incorporated herein by reference in its entirety. Nosratinia proposes a shift-averaging technique which consists of applying multiple shifted versions of the JPEG compression operator to an image, and then averaging the results. As described by Nosratinia, "the JPEG encoding process is known to reduce[ ] the high-frequency content of the image. In other words, the high-frequency components of the image are quantized more coarsely than lower frequencies. But at the same time, high frequency components are introduced at the edges of the blocks, because these edges effectively are not 'seen' in the DCT block-spectrum of JPEG. By taking various shifts of JPEG, the original block boundaries will be exposed to the frequency shaping of the JPEG encoding process, thus the magnitude of the blockiness will be reduced."

According to one aspect of the invention, the shift averaging technique described above, which can reduce blockiness in source images, can be modified to selectively shape at least some of the DCT coefficients (e.g., the non-DC coefficients) using a variable gain or other shaping function to sharpen the image without introducing additional blockiness. In some embodiments, the source images can be encoded using conventional DCT-compression techniques, including, but not limited to, JPEG, MPEG2, MPEG4, DivX, H.264, and AVC. Further, the sharpening strength can be adjusted by changing the variable gain. In one embodiment, in addition to noise and overshoot reduction, image sharpening can be achieved by applying a non-linear transform of the DCT coefficients using a coefficient amplitude shaping lookup table (LUT). Some embodiments are configured to operate on all types of compressed signals (e.g., video coding formats including MPEG, H.261, and others) and on original and scaled-up sources to produce natural and visually pleasing results without adversely affecting high quality images. In some embodiments, the shaping function can be implemented within an image processing system (e.g., in hardware, software executed by a computer, and/or firmware) of a digital television, DVD (Digital Versatile Disc) player, cable television set-top box, mobile telephone, or other such video device. In some embodiments, post-compression image processing can be accomplished without a priori knowledge of the original coefficients used for compression of the video input signal.

FIG. 1 is a block diagram of a conventional image processing technique similar to the one described by Nosratinia. A video input signal 110 is received by a line buffer 112. From the line buffer 112, the video input signal 110 is shifted in vertical and horizontal directions (e.g., by (i, j) pixels) at block 114 to generate a shifted video signal 116. Next, DCT block transform coding 118 is applied to each shifted block (e.g., blocks 150, 152, and 154 in FIG. 2B) of the video signal 116. The DCT conversion 118 produces a set of coefficients corresponding to the shifted image 120. A non-linear transform (NLT) 122 is used to quantize the DCT coefficients of the converted shifted image 120, which produces a quantized shifted image 124. An inverse DCT reverse conversion 126 transforms the quantized shifted image 124 into a processed shifted image 128. The processed shifted image 128 is shifted back to the original position (e.g., by (−i,−j) pixels) at block 130 to produce a re-shifted processed image 132. The video input signal 110 can be shifted in n combinations of vertical and horizontal directions, and the above sequence is applied to each shifted image (e.g., shifted images 1−n). The re-shifted processed image 132 is averaged with all other re-shifted processed images at block 134 to produce a combined processed image 136, which may then be displayed by a display such as a TV, computer monitor, or printer. The combined processed image 136 is a denoised version of the video input signal 110.

In Nosratinia, the quantization parameter and the quantization matrix used in the non-linear transform NLT 122 are set to the same values as those in the compressed image based on information contained in the header associated with the video input signal 110. However, this requirement often cannot be satisfied since the quantization information is only available to the decoder (e.g., JPEG or MPEG) and is not transmitted over analog or HDMI (High-Definition Multimedia Interface) connections to the TV or other display device. Furthermore, this technique does not enhance the sharpness of the image.

FIGS. 2A and 2B show one example of how the video input signal 110 can be shifted. As shown in FIG. 2A, each frame 140 of the video input signal 110 is divided into several blocks. In one example, 8×8 blocks (i.e., 8 pixels wide by 8 pixels high) may be used, as the 8×8 size is compatible with the DCT, but 8×4 (horizontal by vertical), or other dimensions, may alternatively be used.

Each block, one of which is indicated in FIGS. 2A and 2B at 150, can be shifted n times vertically and horizontally with respect to the pixels of the frame. For example, block 150 can be shifted twice, producing three windows 150, 152, and 154, shown overlaid upon one another in FIG. 2B. Block 152 is shifted by (−1, −1) pixels relative to block 150, and block 154 is shifted by (+1, +1) pixels relative to block 150. According to one embodiment, various block shift configurations are possible, such as a cross pattern (e.g., diagonal shifts in several directions, such as partially shown for one diagonal direction in FIG. 2B), a quincunx pattern (e.g., a geometric pattern having five coplanar points, four forming a square and one at the center), and a random pattern. In one embodiment, the block shift configuration is programmable (e.g., any number of specific, predetermined block shifts may be used). The shifted blocks may generally cover the entire span of pixels within the original block (e.g., block 150), although it is not necessary to include every possible shift. For example, a large number of shifts may be used, but at the expense of processing time and with a diminishing advantage in the image quality as the number of shifts is increased. In one embodiment, between 8 and 16 block shifts have been found to produce acceptable results.

As mentioned above, within each block (e.g., blocks 150, 152, and 154) are several pixels, including, for example, pixel 142. In the example of FIGS. 2A and 2B, each block has 64 pixels, but it should be appreciated that the block can have any dimensions as long as the block contains more than one pixel. The pixel indicated at 142, therefore, is positioned at different locations with respect to the edges of each block 150, 152 and 154. In block 154, pixel 142 is at position (0,0) of the block (i.e., adjacent to the top and left edges), but in block 150 pixel 142 is at position (1,1), and in block 152 pixel 142 is at position (2,2), both of which are located away from the edges of the respective blocks. Varying the position of pixel 142 with respect to the edges of each block reduces blockiness caused by prior compression of the video input signal 110.

Figure 3:
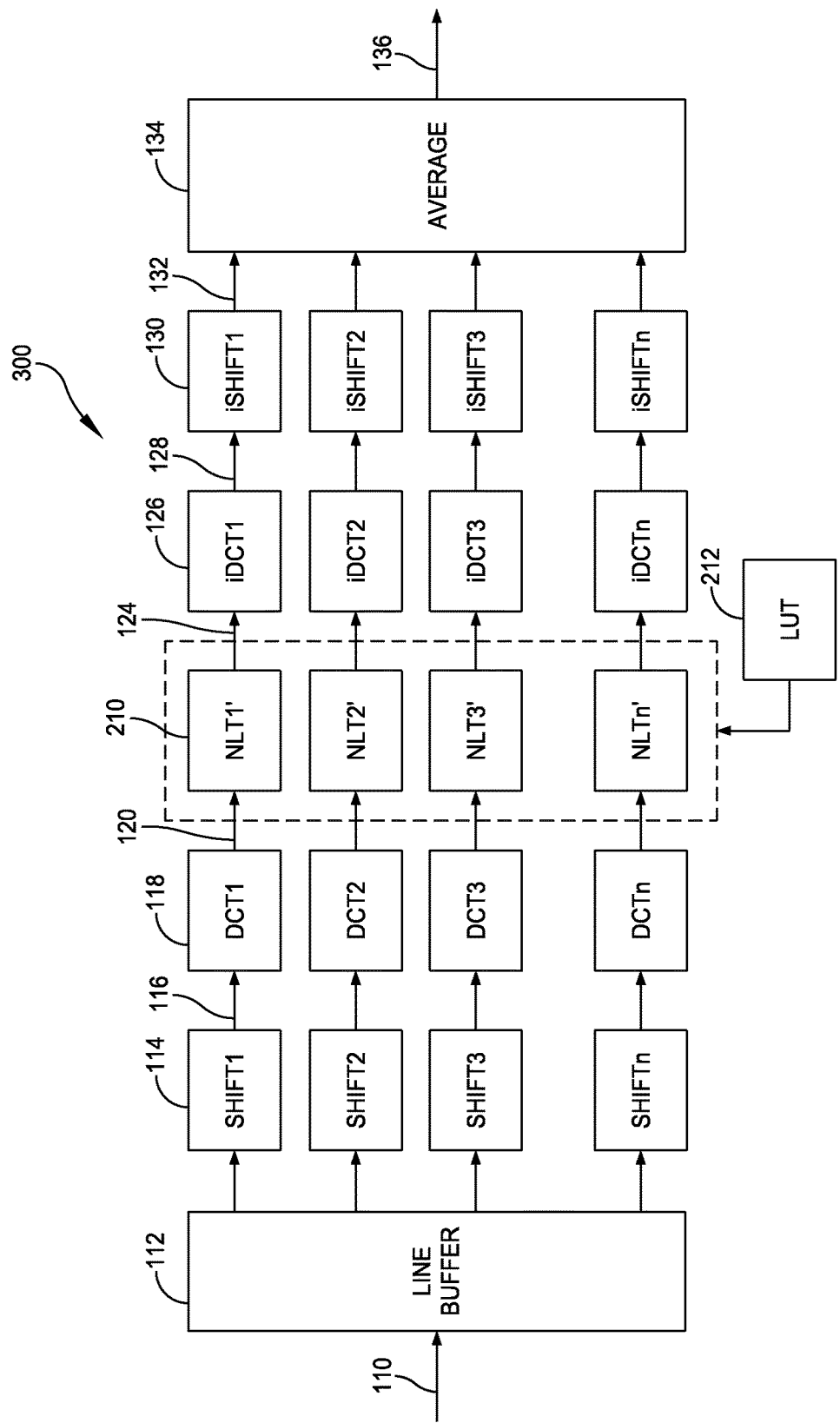
FIG. 3 is a functional block diagram of a video signal processing method in accordance with one embodiment.

FIG. 3 is a block diagram of an image processing sequence 300 similar to the one described above with respect to FIG. 1, except, according to one embodiment, the quantization performed by non-linear transform 210 (e.g., NLT1' through NLTn') applies a variable gain to each of the DCT coefficients generated by the DCT block transform 118.

As described above, the video input signal 110 is received by the line buffer 112. The video input signal 110 may include, for example, JPEG or MPEG encoding. From the line buffer 112, the video input signal 110 is shifted in vertical and horizontal directions (e.g., by (i, j) pixels) at block 114 to generate the shifted video signal 116. Next, DCT block transform coding 118 is applied to each shifted block (e.g., blocks 150, 152, and 154 in FIG. 2) of the video signal 116. The DCT conversion 118 produces the set of coefficients corresponding to the shifted image 120.

In this embodiment of the image processing sequence 300, and distinct from the technique described above with respect to FIG. 1, the non-linear transform 210 (e.g., NLT1' through NLTn') applies a variable gain to each non-DC coefficient of the DCT block transform 118 of the converted shifted image 120, which produces the quantized shifted image 124. The DC coefficient of the DCT block transform 118 is not modified. The gain values are a function of the value of the respective DCT coefficients. In one embodiment, the variable gain values can be stored in a lookup table (LUT) 212 for fast processing, although the gain values do not need to be stored in this manner. As described above, the inverse DCT reverse conversion 126 transforms the quantized shifted image 124 into a processed shifted image 128. The processed shifted image 128 is shifted back to the original position (e.g., by (−i, −j) pixels) at block 130 to produce a re-shifted processed image 132. The video input signal 110 can be shifted in n combinations of vertical and horizontal directions, and the above sequence is applied to each shifted image (e.g., shifted images 1–n). The re-shifted processed image 132 is averaged with all other re-shifted processed images at block 134 to produce the combined processed image 136, which may then be displayed by a display such as a TV, computer monitor, or printer. The combined processed image 136 is an enhanced version of the video input signal 110.

Figure 4:
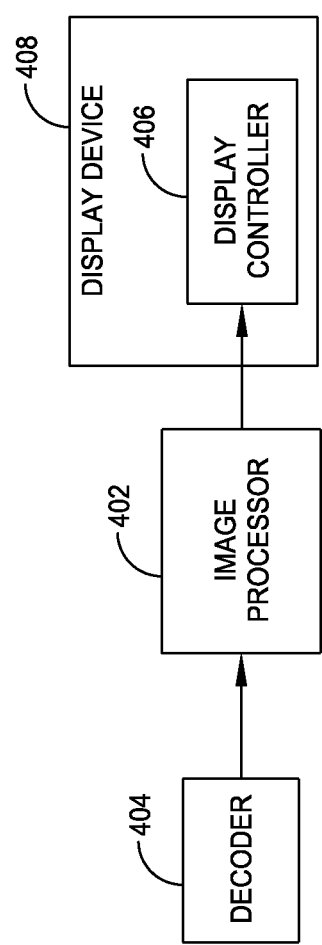
FIG. 4 is a block diagram of a system including an image processor in accordance with one embodiment.

In one embodiment, shown in FIG. 4, the image processing sequence 300 of FIG. 3 can be performed by an image processor 402 configured to receive the input video signal 110 from a decoder 404, and send the combined processed image 136 to a display controller 406 of a display device 408, such as a display controller of a computer display, TV, or other display device. The image processor 402 may be integrated into the display device, or the processor may be in a separate device coupled to the display device, such as a set-top cable box, digital video recorder, or an over-the-air signal receiver.

Figure 5:
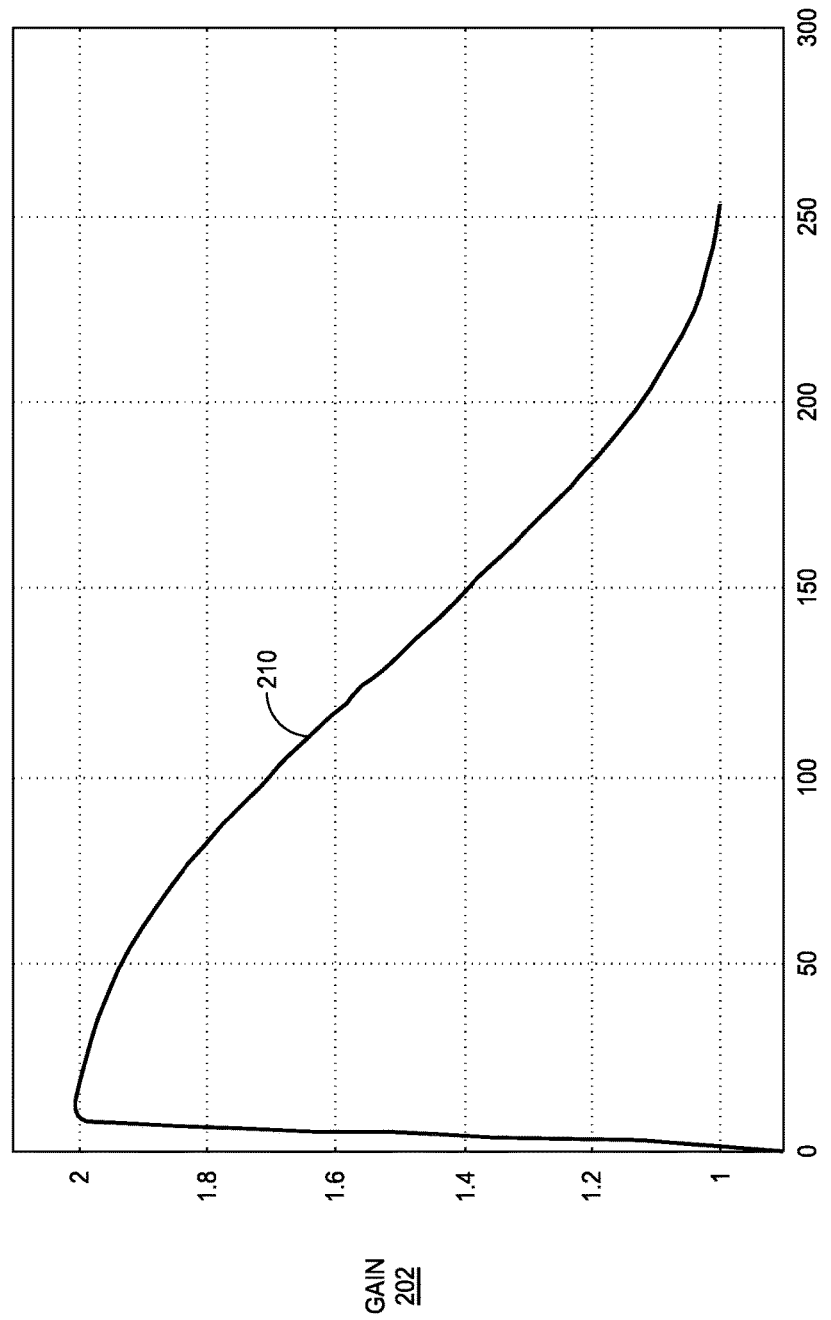
FIG. 5 is a graph showing a variable gain function in accordance with one embodiment.

FIG. 5 shows one embodiment in which the variable gain 202 is a function of the DCT coefficient value 204. The function is represented by line 210. In general, the variable gain function 210 produces low or reduced gain for low-value coefficients and high-value coefficients. Low-value coefficients typically represent noise, and therefore the low-value coefficients should be amplified less than other coefficients, if at all, to avoid amplification of noise in the video signal. High-value coefficients typically generate strong overshoots, and thus the high-value coefficients should be amplified less than other coefficients, if at all, to avoid generating artifacts. In this example, the gain 202 ranges between unity (1.0) and 2.0, although other ranges may be used. The gain 202 for low-value coefficients near zero (e.g., a coefficient having a value between zero and approximately 10) is at or near unity, and quickly rises to about 2.0 as the DCT coefficient value 204 increases. Thereafter, the gain 202 decays as the DCT coefficient value 204 rises. In one embodiment, the degree of sharpening can be adjusted by changing the variable gain function 210, such as by increasing or decreasing the maximum gain produced by the function to a value greater than or less than 2.0, or by changing the profile of the function 210 from the example shown in FIG.

Figure 6:
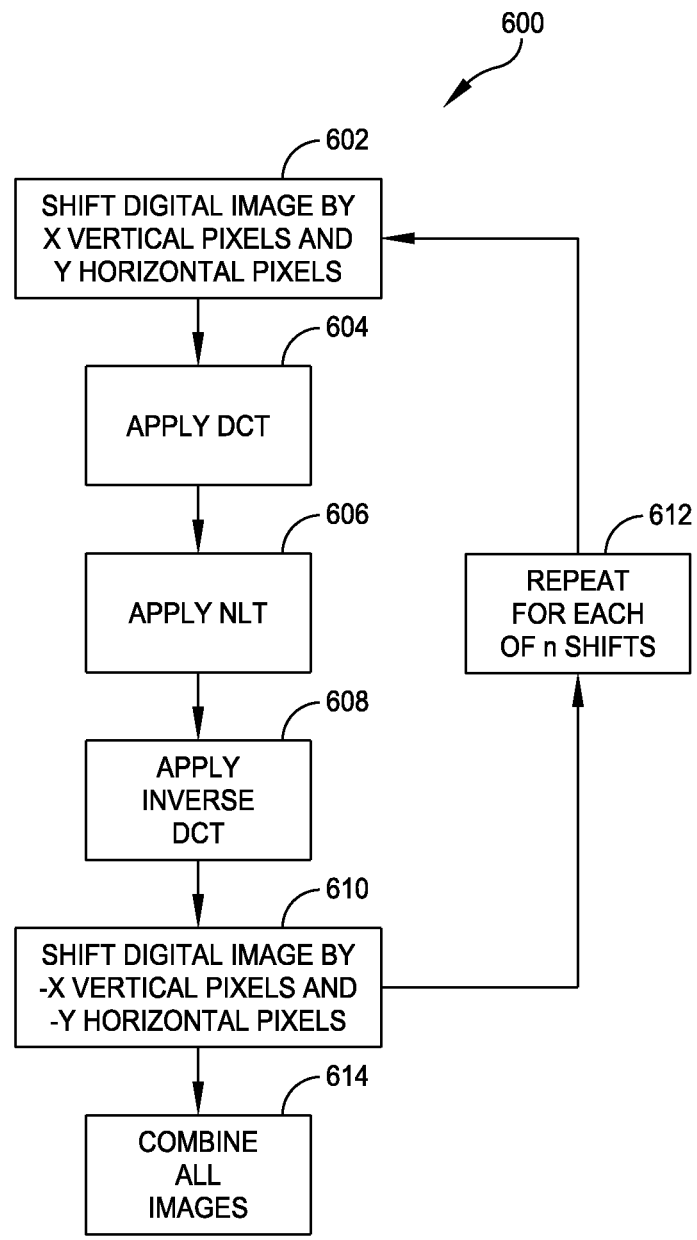
FIG. 6 is a flow diagram of a process for processing a video signal in accordance with one embodiment.

FIG. 6 shows a process 600 for processing a digital image, such as a digital image encoded in the input video signal 110 of FIG. 3. At block 602, the digital image is shifted by x vertical pixels and y horizontal pixels to produce a shifted digital image. At block 604, the shifted digital is transformed by a DCT to produce a plurality of DCT coefficients. At block 606, a non-linear transform is applied to the DCT coefficients to amplify the DCT coefficients by a variable gain and produce a plurality of modified DCT coefficients. At block 608, an inverse DCT is applied to the modified DCT coefficients to produce a modified digital image. At block 610, the modified digital image is shifted by −x vertical pixels and −y horizontal pixels (i.e., re-shifted to the original position prior to shifting at block 602) to produce one of a plurality of realigned digital images. The above-described steps at blocks 602 through 610 are repeated (see block 612) for each of n shifts of the digital image. At block 614, each of the realigned digital images are combined (e.g., by calculating an average of all realigned digital images) to produce a processed digital image. In one embodiment, the processed digital image is sent to a display controller, such as the display controller 404 of FIG. 4, so that the processed digital image may, for example, be displayed on a TV or computer display. One of ordinary skill in the art will appreciate that the processed digital image may be treated in other ways, such as storing the image on a DVD, flash storage chip, hard disk drive, or other image storage device, for future use.

As discussed above with respect to FIG. 1, in some known image processing techniques the quantization parameter and the quantization matrix used in the NLT 122 are set to the same values as those in the compressed image. This requires knowledge of the quantization parameters used to compress the source. According to one embodiment, it is appreciated that such quantization information is not always known at the post-processing stage (e.g., a set-top box, a digital TV, etc.). By contrast, in this embodiment, the DCT can be applied without any a priori knowledge of the quantization information at least because a variable gain is used to amplify the DCT coefficients. Further, it has not previously been known to use conventional JPEG or MPEG post-processing techniques to increase sharpness. For example, some prior post-processing techniques, such as Nosratinia, utilize the JPEG-standard quantization matrix for JPEG-based compression, which may reduce artifacts (e.g., blockiness) but does not improve sharpness. This is in contrast to one embodiment that utilizes a variable gain function of the DCT coefficient to enhance the quality of the image including increasing sharpness without introducing blockiness.

As described above, in one embodiment, the DCT coefficients can be shaped by adjusting their amplitude(s) using a variable gain function based on the corresponding amplitude(s). In other embodiments, other coefficient shaping techniques can be used to increase sharpness. For example, the DCT coefficients may be modified as a function of the rise/fall time of a value of each coefficient, or as a function of the value of other coefficients.

Some embodiments may be implemented in hardware, firmware, or in the form of instructions that are stored on a computer-readable medium (e.g., memory, hard disk, and so forth), which, when executed by one or more processors, cause the processor to perform the methods described herein, or methods having similar functionality to the methods described herein. The processor may be, for example, a general purpose processor, or an application-specific processor, such as is typically provided in commercial printers or TV display controllers, or one of the processors described above.

Having thus described several aspects of at least one embodiment of the invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method of processing a decoded digital image of an encoded digital image, wherein the decoded digital image is divided into a plurality of blocks, comprising:
   shifting a block of the decoded digital image by x vertical pixels and y horizontal pixels to produce a shifted digital image block;
   applying a discrete cosine transform (DCT) to the shifted digital image block to produce a DCT coefficient;

applying a non-linear transform to the DCT coefficient to produce a modified DCT coefficient without quantization information for the encoded digital image, the non-linear transform being configured to amplify the DCT coefficient by approximately a unity gain which varies as a function of a value of a parameter of non-DC DCT coefficients having frequencies near a low end and near a high end of a range of frequencies and a non-unity gain for non-DC DCT coefficients therebetween;

applying an inverse DCT to the modified DCT coefficient to produce a modified shifted digital image block;

shifting the modified shifted digital image block by −x vertical pixels and −y horizontal pixels to produce a realigned digital image block;

repeating the acts of shifting by x and y pixels, applying the DCT, applying the non-linear transform, applying the inverse DCT, and shifting by −x and −y pixels for a plurality of different values of x and y to produce additional realigned digital image blocks; and combining the plurality of realigned digital image blocks to produce a processed digital image.

2. The method of claim 1, further comprising storing predetermined gain values for the function in a lookup table (LUT).

3. The method of claim 2, wherein applying the non-linear transform includes multiplying a non-DC DCT coefficient by a gain selected from the LUT based on a value of that non-DC DCT coefficient.

4. The method of claim 1, wherein the function is configured to produce approximately the unity gain for the non-DC DCT coefficients corresponding to at least one of a noise signal and an overshoot signal.

5. The method of claim 4, wherein a non-DC DCT coefficient represents an amplitude, and wherein the function is further configured to produce an increasing gain as the amplitude increases below a predetermined value, and to produce a decreasing gain as the amplitude increases above the predetermined value.

6. The method of claim 1, further comprising performing the acts of shifting by x and y pixels, applying the DCT, applying the non-linear transform, applying the inverse DCT, and shifting by −x and −y pixels for the plurality of different values of x and y to a plurality of blocks substantially simultaneously.

7. The method of claim 1, wherein combining the plurality of realigned digital image blocks comprises averaging the plurality of realigned digital image blocks.

8. A non-transitory computer readable medium comprising computer-executable instructions stored thereon that when executed on at least one processor perform the method according to claim 1.

9. An image processing device, comprising:
at least one processor configured to:
receive a decoded digital image of an encoded digital image, wherein the decoded digital image is divided into a plurality of blocks;
shift a block of the decoded digital image by x vertical pixels and y horizontal pixels to produce a shifted digital image block;
apply a discrete cosine transform (DCT) to the shifted digital image block to produce a DCT coefficient;
apply a non-linear transform to the DCT coefficient to produce a modified DCT coefficient without quantization information for the encoded digital image, the non-linear transform being configured to amplify the DCT coefficient by approximately a unity gain which varies as a function of a value of a parameter of non-DC DCT coefficients having frequencies near a low end and near a high end of a range of frequencies and a non-unity gain for non-DC DCT coefficients therebetween;
apply an inverse DCT to the modified DCT coefficient to produce a modified shifted digital image block;
shift the modified shifted digital image block by −x vertical pixels and −y horizontal pixels to produce one of a plurality of realigned digital images;
repeat the acts of shifting by x and y pixels, applying the DCT, applying the non-linear transform, applying the inverse DCT, and shifting by −x and −y pixels for a plurality of different values of x and y to produce additional realigned digital image blocks;
combine the plurality of realigned digital image blocks to produce a processed digital image; and
output the processed digital image to a display device.

10. The image processing device of claim 9, further comprising a lookup table (LUT) which stores pre-determined gain values for the function.

11. The image processing device of claim 10, wherein applying the non-linear transform includes multiplying a non-DC DCT coefficient by a gain selected from the LUT based on a value of that non-DC DCT coefficient.

12. The image processing device of claim 9, wherein the function is configured to produce approximately the unity gain for the non-DC DCT coefficients corresponding to at least one of a noise signal and an overshoot signal.

13. The image processing device of claim 12, wherein a non-DC DCT coefficient represents an amplitude, and wherein the function is further configured to produce an increasing gain as the amplitude increases below a predetermined value, and to produce a decreasing gain as the amplitude increases above the predetermined value.

14. The image processing device of claim 9, wherein the processor is further configured to perform the acts of shifting by x and y pixels, applying the DCT, applying the non-linear transform, applying the inverse DCT, and shifting by −x and −y pixels for the plurality of different values of x and y to a plurality of blocks substantially simultaneously.

15. The image processing device of claim 9, wherein the processor is configured to average the plurality of realigned digital image blocks.

16. The image processing device of claim 9, wherein the image processing device is configured to be integrated into a digital television.

17. The image processing device of claim 9, wherein the image processing device is configured to be integrated into a mobile telephone.

18. The image processing device of claim 9, wherein the image processing device is configured to be integrated into a set top box.

19. The image processing device of claim 9, wherein the image processing device is configured to be integrated into an integrated circuit.

* * * * *